(No Model.) 3 Sheets—Sheet 1.

J. WHITNEY.
APPARATUS FOR MAKING MALT.

No. 395,468. Patented Jan. 1, 1889.

WITNESSES: INVENTOR:
J. Whitney
BY Munn & Co.
ATTORNEYS.

(No Model.) 3 Sheets—Sheet 2.

J. WHITNEY.
APPARATUS FOR MAKING MALT.

No. 395,468. Patented Jan. 1, 1889.

WITNESSES:

INVENTOR:
J. Whitney
BY Munn &Co
ATTORNEYS.

N. PETERS, Photo-Lithographer, Washington, D. C.

(No Model.)  3 Sheets—Sheet 3.
J. WHITNEY.
APPARATUS FOR MAKING MALT.
No. 395,468. Patented Jan. 1, 1889.
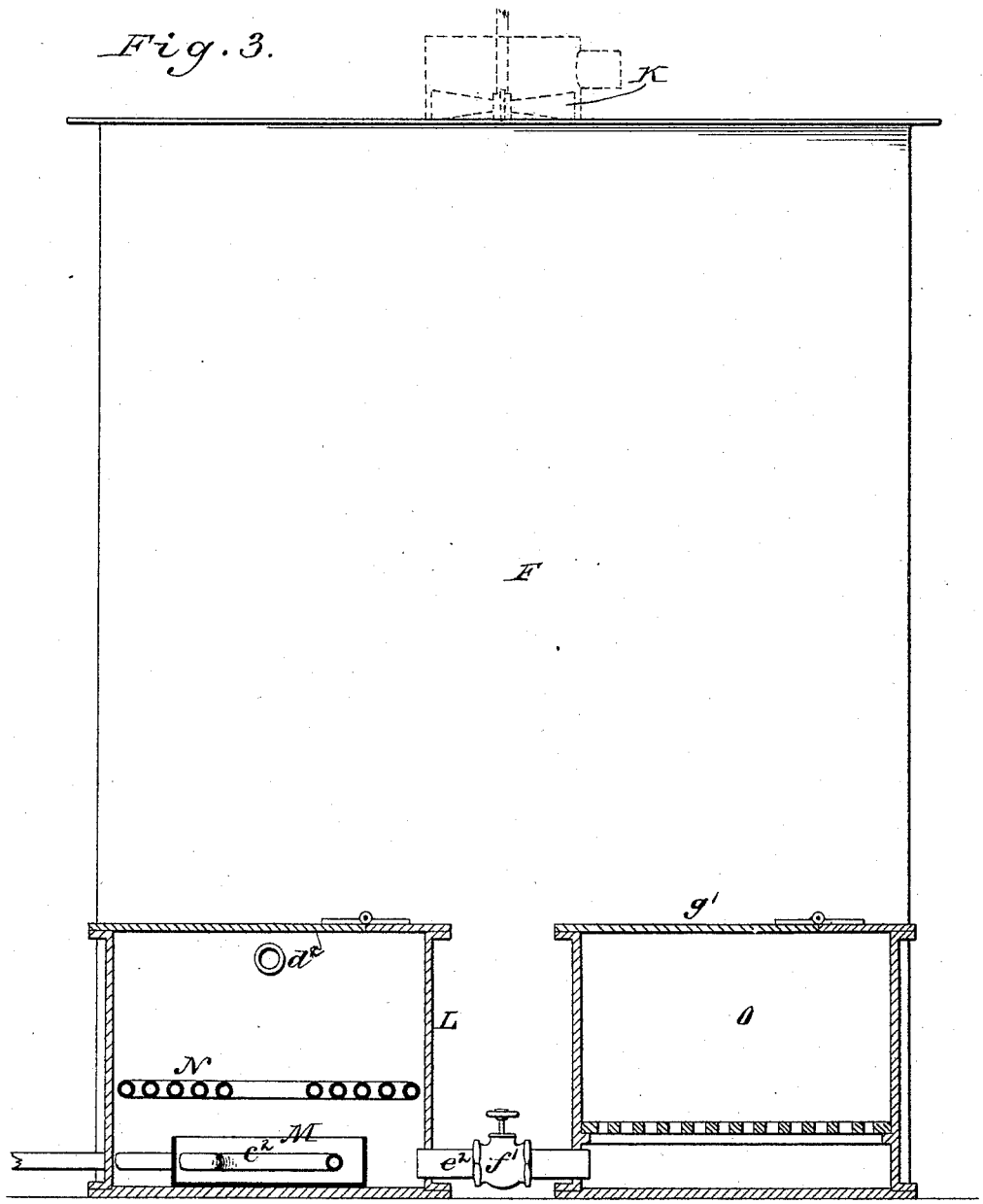
WITNESSES:
INVENTOR:
J. Whitney
BY Munn & Co
ATTORNEYS.

UNITED STATES PATENT OFFICE.

JUSTIN WHITNEY, OF BOSTON, MASSACHUSETTS.

APPARATUS FOR MAKING MALT.

SPECIFICATION forming part of Letters Patent No. 395,468, dated January 1, 1889.

Application filed July 28, 1885. Serial No. 172,877. (No model.)

*To all whom it may concern:*

Be it known that I, JUSTIN WHITNEY, of Boston, in the county of Suffolk and State of Massachusetts, have invented certain new and useful Improvements in Apparatus for Making Malt, of which the following is a full, clear, and exact description.

My invention consists in novel means and apparatus for making malt, substantially as herein shown and described, and pointed out in the claims, whereby malt may be made in widely-varying temperatures and conditions of the atmosphere, ranging, say, from polar cold to torrid heat, and from the densest fogs to the dryest summer heat. The whole operation is or may be performed mechanically, and a better quality of malt is produced at a great saving of time and labor.

Reference is to be had to the accompanying drawings, forming part of this specification, in which similar letters of reference indicate corresponding parts in all the figures.

Figure 1:
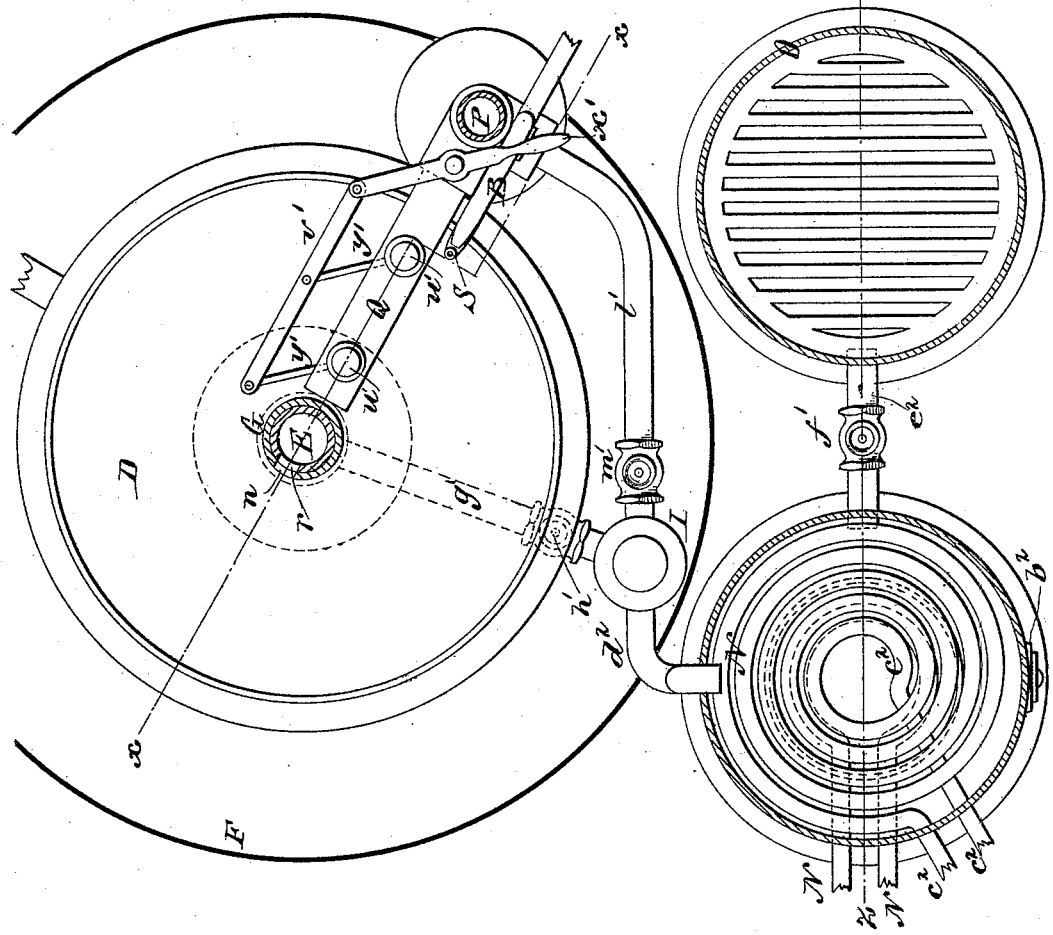
Figure 2:
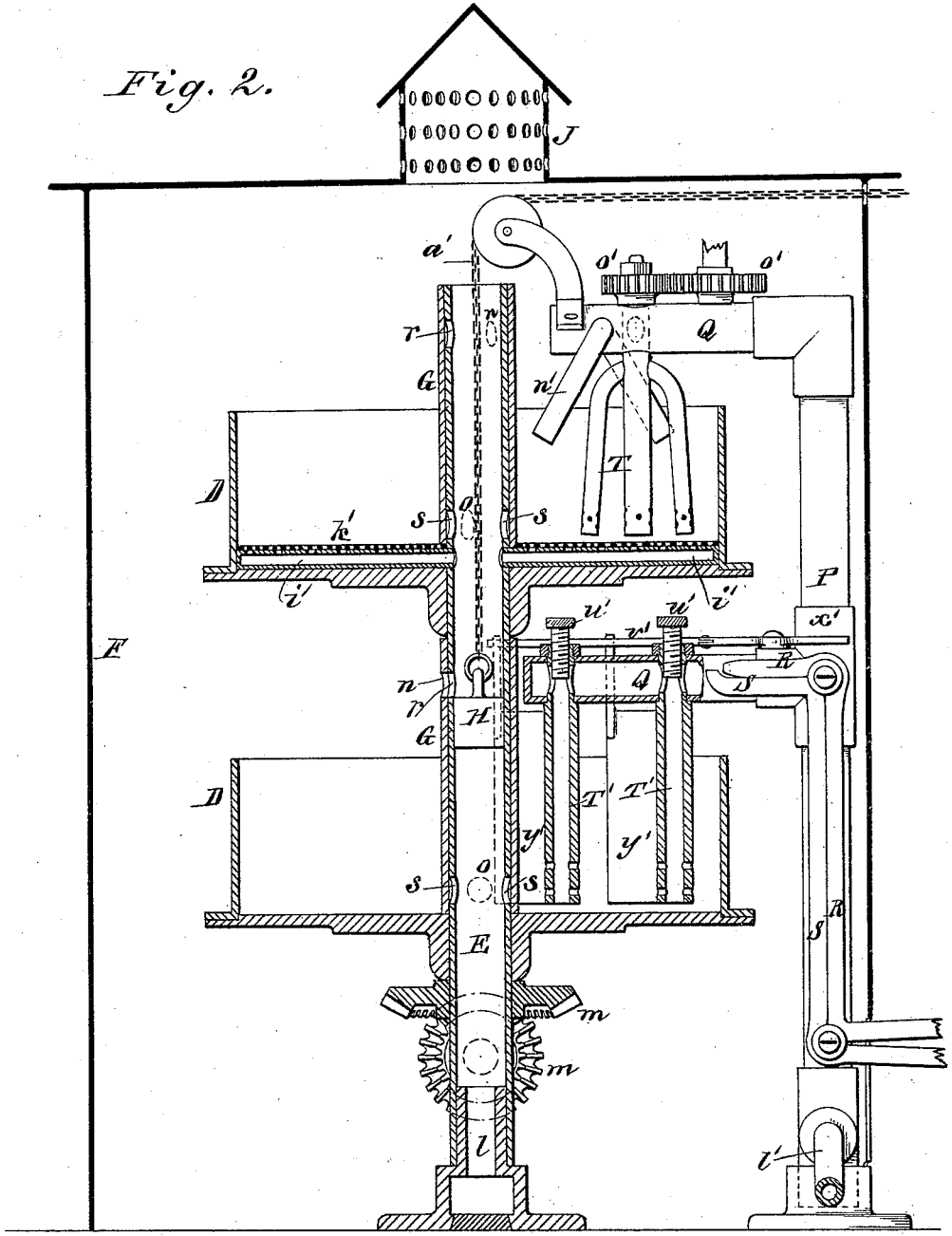

Figure 1 represents a partly-sectional plan of the apparatus; Fig. 2, a vertical section upon the line $x\,x$ in Fig. 1; Fig. 3, mainly a vertical section of certain means used for tempering the air used in making the malt.

In order to produce a homogeneous product and good quality of malt it is desirable that grain of a uniform specific gravity should be used—that is, that the heavier grains should be worked separately from the lighter ones. To this end, when working grains of varying specific gravity, the apparatus may have combined with it any suitable means for separating the heavy from the light grains; but these form no part of the present invention. The grain, whether thus separated or not, is then passed to the malting-machine. Thus the grain is transferred by an elevator or otherwise into one or more pans arranged to rotate about a vertical axis within a case or chamber. The drawings show two of such pans, D D', arranged at a suitable distance apart, one above the other, fast on a tubular upright shaft, E, within an inclosing case or chamber, F. Said tubular shaft is represented as open both above and below and as resting on a tubular step, $l$.

Friction rollers or wheels (not shown in the drawings) may be used in connection with or in place of the central tubular step, $l$. Said tubular shaft and the pans may be rotated through gearing $m\,m$, or otherwise, by steam or other power. Closely fitting around the portions of said tubular shaft E which pass up through and above the pans are valves or tubular sleeves G G, each provided with an upper side aperture, $n$, and lower side apertures $o$. These apertures match, respectively, with side openings $r\,s$ in the tubular shaft E, when the sleeves G G are adjusted for the purpose, and the several apertures being so arranged that when the apertures $n$ of the sleeves are in line with the apertures $r$ in the hollow shaft E the apertures $o$ are out of line or communication with the apertures $s$, and vice versa.

To charge either pan D D' with grain, the sleeve G of the pan is turned to bring its opening $n$ into line with the aperture $r$ in the same line or plane, and a rising and falling plug or valve, H, within the tubular shaft E, adjusted as by a chain, $a'$, to form a stop or temporary partition in said shaft immediately below the openings $n\,r$, thereby causing the grain entering by means of a spout leading from a reservoir at a higher point at top of the hollow shaft E to flow into and charge the pan as required. When it is required to discharge the grain from either pan, the plug or valve H, if not in proper position for the purpose, is adjusted—*i. e.,* raised above the openings $o\,s$ in the sleeve G of said pan and portion of the shaft E covered by said sleeve, and the sleeve turned to bring said apertures $o\,s$ into line. The wings or vanes $y'$ on the stirrers T' T', hereinafter described, are then turned toward the shaft E and the pan D revolved, thus causing the grain to move toward the center of the pan and discharge through the coincident openings $o\,s$ down through the hollow shaft E and its tubular step $l$ into a receptacle, (not here shown,) and which may be provided with necessary chutes, belts, &c., to convey it away for transportation or use on the premises. Any suitable indicator connected with the chain $a'$ may be used to determine the positions of the plug or valve H within the tubular shaft and relatively to the pans, if more than one, which it controls the feed to and discharging from, as described.

The grain while in the rotating pans D D' is exposed in a constant manner to a forced current or currents of moist air at a low temperature to complete the germinating process, and subsequently to a forced current or currents of moderately heated air, and later on more highly heated air until the malt is finished, after which it is discharged from the pans. These forced currents of tempered air into, through, or upon the grain in process of malting may either be produced by a pressure fan or blower, I, of any suitable construction, arranged, say, exterior to one side of the case F, which may be provided with a ventilator, J, at its top, as shown in Fig. 2; or such forced current or currents may be produced by a suction fan or device, K, on top of the case in place of the ventilator, as shown by dotted lines in Fig. 5, other openings in the case liable to interfere with the suction of the tempered air being closed; or both the pressure device or blower and suction fan or device may be jointly used for the purpose. It will suffice here, however, to describe the forcing operation of the tempered air as produced by a pressure device or blower, and this I prefer to a suction device.

To subject the grain in the rotating malting pan or pans to a forced current or currents of moist air at a low temperature to complete the germinating process, the air is introduced into a tempering receptacle or chamber, L, as through a side opening, which may be closed by a lid or door, $b^2$, Fig. 1. This receptacle L is provided with an evaporating-pan, M, containing water, and having a coil of pipes, $c^2$, through which steam is circulated to evaporate the water and moisten the air. Said receptacle L is also provided with a coil of pipes, N, through which superheated or other steam is passed to heat the air, when required, in the receptacle L. From this receptacle the tempered air is passed in a forced current or currents, as described, to or through the grain in the rotating pans—as, for instance, first by a pipe, $d^2$, Fig. 1, to the blower I, which expels or delivers it, as required.

Connected with the receptacle L, as by a pipe, $e^2$, subject to control by a stop-cock, $f'$, is a refrigerating and drying chamber, O, which consists of an ice-box in which ice is packed, and which has the usual draining perforated false bottom of such structures. When the lid $b^2$ of receptacle L is open, the air has, obviously, free admission; but in case the air is too moist the said lid may be closed and the lid $g'$ of the adjacent chamber O opened, when the air will be forced to pass in contact with the ice in chamber O, and thus become deprived of the greater portion of its moisture before entering the receptacle through the pipe $e^2$, (whose cock $f'$ is opened for the purpose.)

The evaporating-pan M, with its coil of steam-pipes $c^2$, may be used when the atmosphere is not sufficiently moist, and the coil of steam-pipes N may be used to raise the temperature in very cold weather, or for first moderately heating the forced current of air to the grain in the pans after the germinating process has been completed by the moist air, and subsequently by passing superheated steam through said coil N for more highly heating the forced supply of air to dry or finish the malt.

It will thus be seen that not only may air in its natural condition be supplied to the grain in the pan or pans, but by means of the air cooling and drying ice-box O and the connected air moistening and heating chamber L either artificially cold or heated air, artificially moistened air, or, by first passing the air through the ice-box and then through the heater, hot dry air may be applied to the grain. Again, when a mass of grain is being treated during a hot day, when the atmosphere is of too high a temperature, the temperature of the air may first be reduced by passing it through the ice-box O, then be sufficiently moistened and raised to a proper temperature by passing it through the moistening and heating chamber L, and from thence passing it to the grain to be treated.

From the blower I the tempered air, be it either moistened or at a low temperature, air at a higher temperature and dried, or highly-heated air, according to the natural conditions of the atmosphere and the different stages in the malting process, may be passed by a pipe, $g'$, Fig. 1, on opening a cock, $h'$, for the purpose, into the hollow shaft E, through the hollow step $l$, the shaft when this is done being closed at the top and bottom, and from thence be expelled through a series of perforated arms or tubes, $i'$, Fig. 2, and a screen, $k'$, in the bottom of either pan through the grain; or said tempered air may be passed by a pipe, $l'$, from the blower, on opening a cock, $m'$, into an upright pipe, P, and from thence by one or more branch pipes, Q, either into and through one or more distributing-pipes, $n'$, over the top of the grain in either pan, or within the grain through a hollow stirrer in the pan; or the tempered air may be supplied to or through the grain by any two or all of these means, as the condition of the grain and other circumstances may require.

In some cases it may be desired to finely sprinkle the grain with water while the germinating process is being conducted. This may be done by forcing a blast of air and current of water through atomizing-tubes R S, arranged to project over either pan.

The stirrers which serve to agitate the grain while under treatment in the pans, to give a better and more thorough exposure of the grain, are arranged to one side of the axes of the pans, and the same may either be hollow or solid, but preferably hollow, and provided with a series of fine perforations in their legs or arms, which enter down within the grain to distribute the forced current or currents of tempered air through them, as specified. Such laterally-arranged agitators or stirrers are made movable. Thus, as shown in Fig. 2, the upper pan, D', is represented as provided with a laterally-arranged upright perforated tubular stirrer, T, having a rotary motion about its own axis by gears o' o', or otherwise, while the lower pan, D, is represented as provided with a laterally-arranged stirrer consisting of movable or adjustable upright arms T' T', also arranged to project down into the grain, and which may likewise be tubular and perforated to convey the tempered air into the grain, and be provided with valves u', to regulate the amount of tempered air passing down through them, adapted to turn or rotate on their own axes, and are connected by a rod, v, having a handle, X', attached, which devices enable them to be turned simultaneously for setting the vanes z' at any desired angle relative to the shaft E.

It may here be noted that by the combination, with the rotating pan or pans having a vertical axis, of stirrers arranged to occupy a fixed position on one side of the vertical axis of the pan or pans, regardless as to whether said stirrers are movable or stationary in themselves, increased facility is afforded for examining the grain under action in the pan or pans, inasmuch as the same may be done by the operator standing at a fixed point on one side of the revolving pan or pans without interference by the stirrers. This close or constant examination is very necessary in malting, so that when the germinating process reaches a certain point the grain may be subjected to hot or cold air to arrest the sprouting action. The grain after being exhausted for brewing purposes may be returned to the machine and be dried by it for feeding purposes, making a merchantable article of food. The apparatus or machine is also adapted to drying hops, herbs, and other vegetable materials, &c., or wherever rapid drying is required.

I am aware that both rotary and stationary circular open-topped horizontal pans are used in apparatus for making malt. Consequently no claim to either is made.

Having thus fully described my invention, I claim as new and desire to secure by Letters Patent—

1. The combination, in a malting apparatus, of the horizontal pan or pans, the vertical hollow shaft E, to which they are attached, and means for rotating said shaft, which is provided with inlet and outlet apertures $r\ s$, one or more sleeves, G, provided with lateral apertures $n\ o$, and the valve H, which is vertically adjustable within said shaft, essentially as and for the purpose specified.

2. The combination, with a horizontal pan in which the grain to be treated is placed and on the vertical hollow shaft to which said pan is attached, and means for rotating the same, said shaft having one or more lateral outlets $s$ for the grain from the pan, and an adjustable perforated sleeve or valve controlling said outlet or outlets, of a stirrer within the pan arranged to one side of the vertical axis of the pan and composed of axially-adjustable arms or legs T', provided with side wings or vanes, $y'$, essentially as specified.

3. The combination, in a malting apparatus, of a horizontal pan for containing the grain to be treated, a vertical hollow shaft to which the said pan is attached, and means for rotating said shaft, the perforated pipes $i$, attached to and radiating from the latter at the bottom of the pan, and the screen $k'$, all substantially as shown and described.

JUSTIN WHITNEY.

Witnesses:
A. H. HARRIS,
WILLIAM WEBB.